Feb. 19, 1929.
E. P. BELZ
1,702,959
HARNESS CHAIN TRACE
Filed Feb. 28, 1928
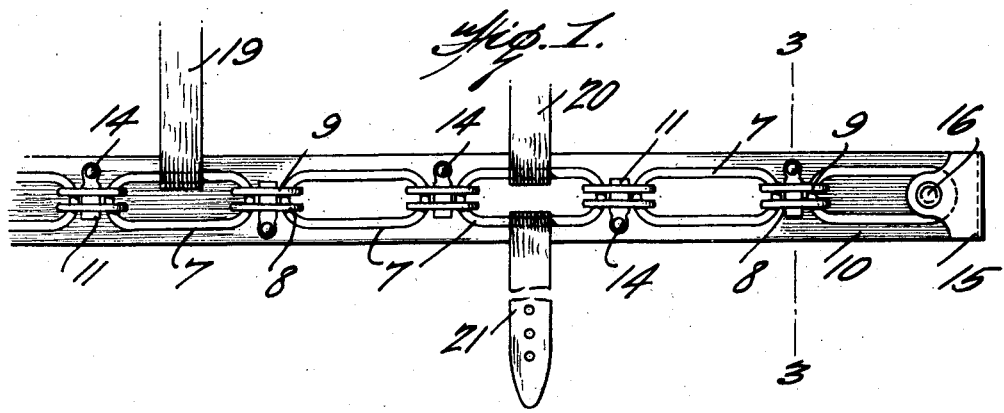
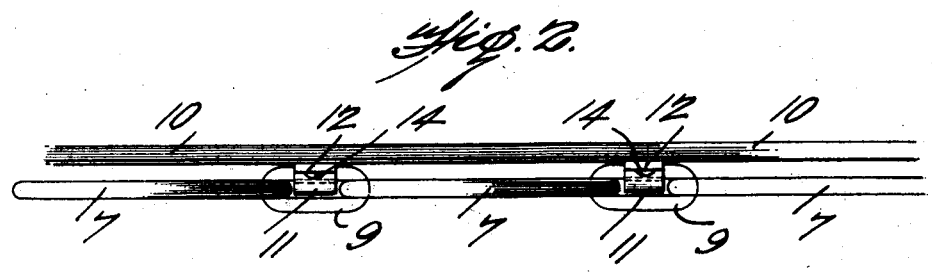
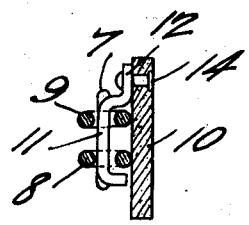
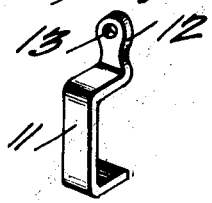
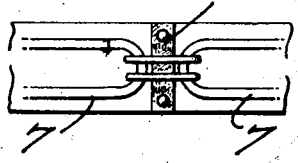
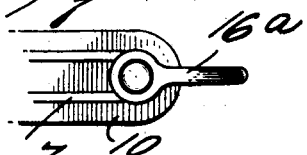
INVENTOR.
Edward Paul Belz,
BY
ATTORNEY.

Patented Feb. 19, 1929.

1,702,959

UNITED STATES PATENT OFFICE.

EDWARD PAUL BELZ, OF IRON RIVER, MICHIGAN.

HARNESS CHAIN TRACE.

Application filed February 28, 1928. Serial No. 257,751.

This invention relates to the general class of harness, and more particularly to traces.

The invention has for an object the production of a trace in which chains are employed and provision is made for preventing the chains from abrading the sides of the animal with which the traces are used; and it is furthermore an object to produce a trace of this character which is flexible and in which the links present flat surfaces to the padding in association with which the chain is used.

It is a still further object of this invention to provide a trace having end connections which may be employed with hames having bolts or clips as the elements to which the chains are connected.

It is a still further object of this invention to provide a trace having chains and protecting pads that are inexpensive although efficient.

With the foregoing and other objects in view, the invention consists in the details of construction and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a fragment of a trace embodying the invention;

Figure 2 illustrates an edge view of the said trace;

Figure 3 illustrates a sectional view on the line 3—3 of Fig. 1 with the chain anchoring element in elevation;

Figure 4 illustrates a perspective view of a chain anchoring element;

Figure 5 illustrates a detail view of a modification; and

Figure 6 illustrates a detail view of a modified hame connection.

In these drawings, an embodiment of the invention is illustrated as comprising a plurality of links 7 and the adjacent links of this type are preferably connected together by links 8 and 9 located at right angles to the first mentioned links. The links 8 and 9 together are equal to the strength of the links 7 and, of course, are constructed of metal of lighter gauge than that of the links 7.

In order to prevent chafing or abrading of the animal on which the traces are used, a protecting pad or web 10 is associated with the chain and preferably the chain and pad are secured together. In the form of the securing device shown in Figs. 1 and 3, a hook 11 extends through the links 8 and 9 and the shank 12 of the hook has an aperture 13 to receive a fastening 14, such as a rivet, by which the hook is anchored to the pad. A plurality of these anchoring devices is employed, but the inventor does not wish to be limited with respect to their number or locations.

A clip 15 is connected to the chain and pad by a fastening 16, such as a rivet or the like, and the type of clip illustrated in Fig. 1 is intended for use in association with hames having bolts to which the clips are connected.

In the modification shown in Fig. 5, a clip 16ª is shown which may be employed with a trace where the trace is to be used with hames having hooks or other anchorages for trace clips.

In Figure 6 there is illustrated a modified means for connecting the trace and pad and, in this form of the invention, strips 17 of any suitable material may be employed, the same extending through the links 8 and 9 and having their ends anchored to the pad by fastenings 18, such as rivets or the like.

Suitable straps 19, 20 and 21 may be connected to such links 7 as are appropriately located when the several straps are to be used, as the belly band, market strap and lazy straps, respectively.

Owing to the arrangement of the main links and the connecting links, the surfaces of the links engaging the pads are straight and therefore will not offer projections which would tend to injure the animals with which the traces are used.

I claim:

1. A trace having a chain comprising a plurality of links in spaced relation to each other, open links connecting the adjacent ends of the first mentioned links, a pad with which the chain is associated, and means extending through the second mentioned links and anchored to the pad for retaining the chain in associated relation to the pad.

2. A trace having a chain comprising a plurality of links in spaced relation to each other, pairs of links connecting the adjacent ends of the first mentioned links, a pad with which the chain is associated, hooks extending through the second mentioned links, the said hooks having apertured shanks, and fastenings in the said apertures and pad for anchoring the fastenings to the pad and for retaining the chain and pad in assembled relation to each other.

3. A trace having a chain comprising a plurality of links in spaced relation to each other, pairs of links connecting the adjacent ends of the first mentioned links, a pad with which the chain is associated, hooks extending through the second mentioned links, the said hooks having apertured shanks, fastenings in the said apertures and pad for anchoring the fastenings to the pad and for retaining the chain and pad in assmebled relation to each other, and clips on the end of said trace.

4. A trace having a chain comprising a plurality of links in spaced relation to each other, pairs of links connecting the adjacent ends of the first mentioned links, a pad with which the chain is associated, fastenings comprising strips of material extending through the second mentioned links, and elements for fastening the strips to the pad.

5. A trace having a chain comprising a plurality of connected links some of which are open, a pad with which the chain is associated, and means extending through the openings of some of the open links and anchored to the pad for retaining the chain slidably in associated relation to the pad.

EDWARD PAUL BELZ.